Nov. 25, 1930.  W. A. FREEMAN  1,782,607
LOADING DEVICE
Filed Feb. 1, 1928  2 Sheets-Sheet 1
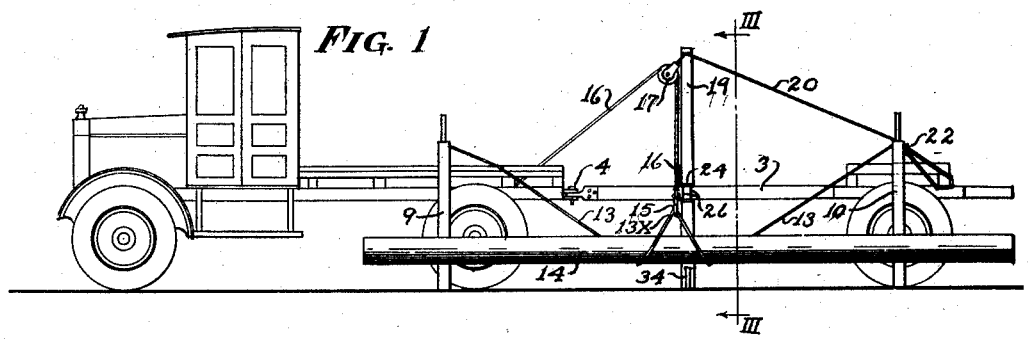
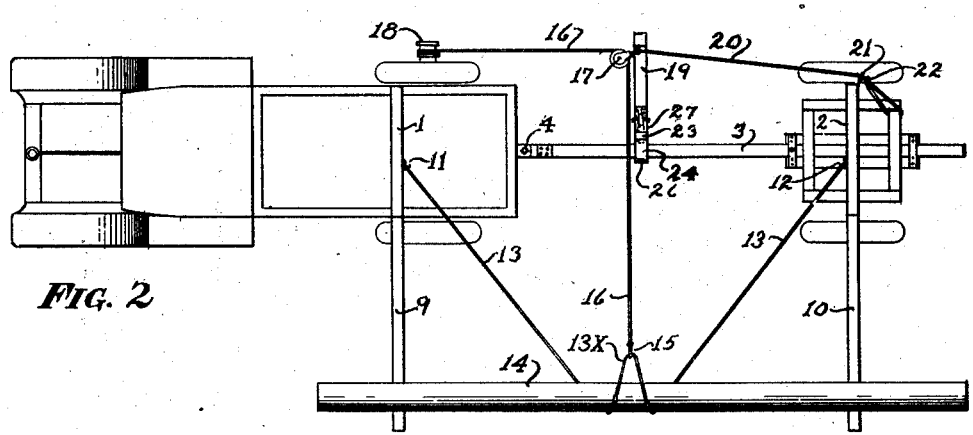
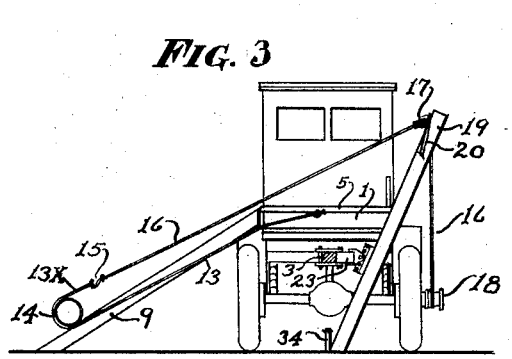
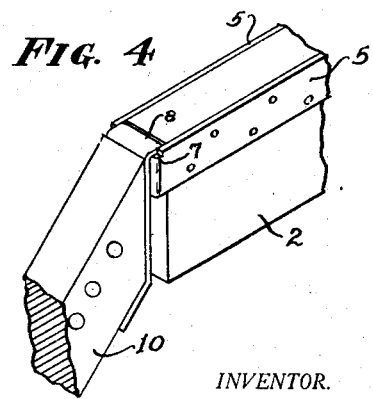
INVENTOR.
Walter A. Freeman
BY William C. Edwards Jr.
ATTORNEY.

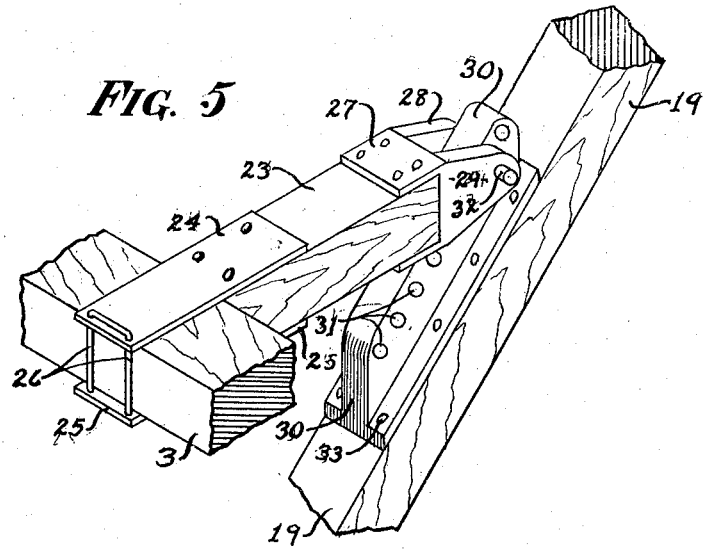
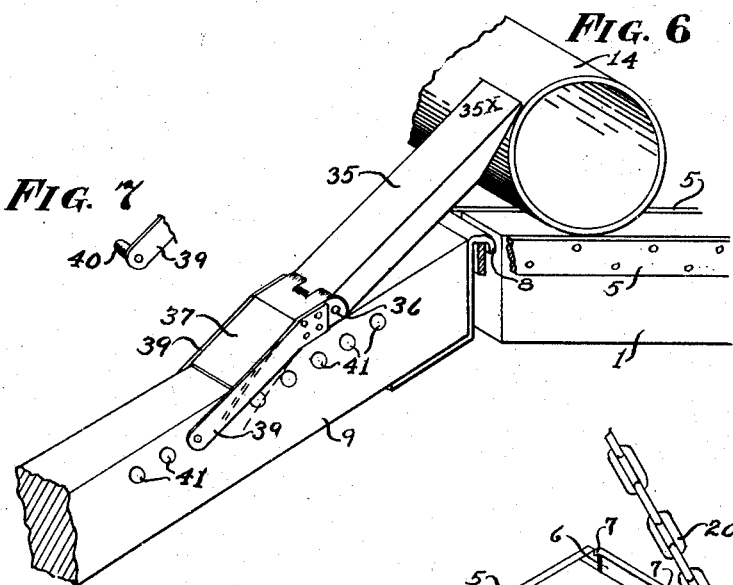
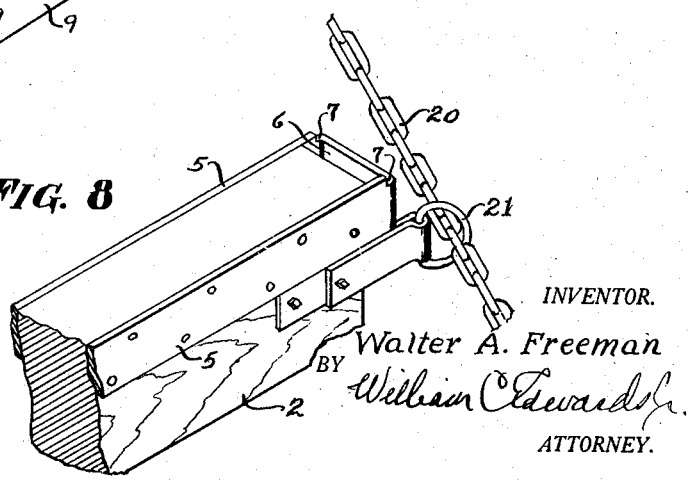

Patented Nov. 25, 1930

1,782,607

UNITED STATES PATENT OFFICE

WALTER A. FREEMAN, OF AUGUSTA, KANSAS

LOADING DEVICE

Application filed February 1, 1928. Serial No. 251,134.

The invention relates to a device for loading round objects, such as oil well casing, upon a truck and trailer and has for its object to furnish a device which will simplify the loading of such round objects and provide a device which is speedy in its operation and also one that can be handled by a single operator.

Referring to the drawings; Fig. 1 shows a side view of a truck with a trailer attached and with which is allied my improved device in its operative position. Fig. 2 shows a plan view of Fig. 1. Fig. 3 represents a view taken along the line III—III, Fig. 1. Fig. 4 is a detail view showing the connection of a skid pole with a bolster. Fig. 5 is a detail perspective view showing the adjustment and connection of the boom pole to the tongue of the trailer. Fig. 6 is a perspective view of the bolster and skid pole assembly with an adjustable supplementary skid as employed for the purpose of raising the pipe up to a second layer of pipe upon the bolsters. Fig. 7 is a perspective view of the lower end of the adjusting mechanism of the supplementary skid. Fig. 8 is a detail view of the end of the trailer bolster showing a chain serving as a guy to the boom pole. Similar numerals of reference indicate corresponding parts throughout all the figures of the drawings.

Referring to the drawings; at 1 is seen a bolster mounted upon the truck, while 2 represents a bolster mounted upon the trailer. The trailer is connected to the truck by means of the tongue 3 and the usual pivotal connection as at 4. The bolsters 1 and 2 each have a strap iron member 5 running around the upper edge forming a loop at 6 at either end. The outer end of the loop is notched as at 7 in order to receive a hook 8 rigidly affixed at the end of a skid pole such as 9 and 10. The upper surface of the hook 8 is level with the surface of the bolster. At 11 on bolster 1 and at 12 on bolster 2 are shown hooks adapted to engage the ends of the cable 13. The cable 13 is shown looped around the casing 14 which has been rolled upon the ends of the skid poles 9 and 10 for elevating purposes. The hook 15 on the end of the cable 16 has been engaged with the looped central portion of the cable 13 as at 13$^x$. The cable 16 leads around the pulley 17 and then down to a winch 18 (which is standard equipment upon trucks of this character and not a part of this invention other than that it provides a source of power to operate the loading device) on the truck as seen in Fig. 2. The pulley 17 is attached at the upper end of the boom pole 19. The cable or chain 20 is attached to the top of the pole 19 and runs through the ring 21 as attached to bolster 2 and is looped and secured as at 22 from the frame of the trailer and forms a guy for the boom pole 19. At 23 is shown a spacer rigidly attached to the tongue 3 for supporting the pole 19, by means of two strap iron members 24 and 25 rigid to the spacer 23 and clamped as at 26 by the U-bolt to the tongue 3. At 27 is shown a casting rigidly affixed to the spacer 23; said casting has ear portions 28 and 29 and between the same is received a tongue element 30 having holes 31 at spaced intervals. A removable pin 32 passed through the ear portions 28 and 29 and any hole 31 forms a pivotal connection between the member 30 and the spacer 23. This tongue 30 is rigid to the pole 19 by bolts or screws such as 33. As seen in Fig. 3, the pole 19 is inclined at an angle to the ground level and the base of the pole rests against a pin 34, driven into the ground, which causes the pole to stand up as disclosed.

The operation is as follows: As the power is applied to the winch 18, the cable 16 is wound up which exerts a pull upon the loop of the cable 13 and causes the casing 14 to roll up the skids 9 and 10, as will be readily understood, and upon the bolsters 1 and 2 to a desired position of rest thereupon. Additional casing is rolled upon said bolsters in the same manner until the first layer is completed. At this time, a supplemental skid, Fig. 6 is employed; one for skid 10 as well as that illustrated for skid 9; the purpose being to elevate further casing as a second layer of casing to rest upon the prior course of casing. This supplemental skid comprises a short skid member 35 cut as at the end 35$^x$ to bear upon the outer casing 14 of the first course as loaded. The skid 35 is hinged at 36 to a block having a beveled surface 37 to meet the surface of a skid pole 9 or 10 as seen in Fig. 6. Attached to the sides of the block 37 are a pair of spring like bar members 39, 39, each having an inwardly turned short pin element such as 40 which are adapted to engage and enter desired holes 41 as arranged for adjustment purposes in the sides of the skid poles 9 and 10. These spring members 39 may be disengaged as indicated by the dotted lines and the supplemental skid poles 35 be slipped up or down the main skid poles 9 and 10 or so as to adjust the upper ends 35× to rest upon the upper layer of casing as arranged upon the bolsters.

Such modifications may be employed as lie within the scope of the appended claim.

Having fully described my invention, what I now claim as new and desire to secure by Letters Patent is:

The combination with a motor driven truck, of a two wheeled extension truck having a tongue connection to the main truck; a boom pole adapted for support by the ground and intermediate the two truck elements; a spacer rigid to and outwardly extending from the tongue connection and towards the boom pole and terminating in a forked element; a tongue element rigid to an intermediate part of the boom pole; and an adjustable hinged connection of said forked spacer element with the tongue element on said boom pole.

In testimony whereof I affix my signature.

WALTER A. FREEMAN.